United States Patent [19]

Ackroff et al.

[11] Patent Number: 4,800,485
[45] Date of Patent: Jan. 24, 1989

[54] ON-LINE DOCUMENTATION FACILITY

[75] Inventors: John M. Ackroff, Highland Park, N.J.; Michael J. Heffler, New York City, N.Y.; John C. Mitchell, Middletown, N.J.

[73] Assignees: American Telephone and Telegraph Company, New York, N.Y.; Bell Telephone Laboratories, Incorporated, Murray Hill, N.J.

[21] Appl. No.: 875,246

[22] Filed: Jun. 16, 1986

Related U.S. Application Data

[63] Continuation of Ser. No. 383,578, Jun. 1, 1982.

[51] Int. Cl.$^4$ ............................................. G06F 3/02
[52] U.S. Cl. ..................................... 364/200; 364/300
[58] Field of Search ... 364/200 MS-File, 900 MS File

[56] References Cited

U.S. PATENT DOCUMENTS

| 4,107,782 | 8/1978 | Cochran | 364/200 X |
|---|---|---|---|
| 4,109,311 | 8/1978 | Blum et al. | 364/200 |
| 4,156,917 | 5/1979 | Olander, Jr. et al. | 364/200 X |
| 4,188,664 | 2/1980 | De Shon | 364/200 |
| 4,200,913 | 4/1980 | Kuhar et al. | 364/900 |
| 4,202,041 | 5/1980 | Kaplow et al. | 364/900 |
| 4,240,136 | 12/1980 | Kjoller | 364/200 |
| 4,291,198 | 9/1981 | Anderson et al. | 364/900 X |
| 4,370,707 | 1/1983 | Phillips et al. | 364/300 X |
| 4,403,303 | 9/1983 | Howes et al. | 364/900 |

OTHER PUBLICATIONS

DEC *RSTS-11 System User's Guide*, Digital Equipment Corp., Dec-11-Orsua-C-D, 1972, pp. 2-5, 2-6, 4-2-7-4-33.

Rayner, Designing User Interfaces for Friendliness, Proceedings of the IFIPTC 2.7 Working Conference on Command Languages, Sep. 1979, pp. 233-241.

*Primary Examiner*—Gareth D. Shaw
*Assistant Examiner*—Lester G. Kincaid
*Attorney, Agent, or Firm*—Ronald D. Slusky

[57] ABSTRACT

Users of an on-line documentation facility in a computer system are provided with the capability of specifying modifications to be made to the documentation that would otherwise be provided by the system.

9 Claims, 8 Drawing Sheets

SYSTEM RECORD FORMAT

[(MAIN RECORD FLAG - "C" OR "M")##] (1ST SECTION HEADING) ##
(1ST SECTION TEXT) ##...##(LAST SECTION HEADING)##(LAST SECTION TEXT)

[ ] = OPTIONAL

USER RECORD FORMAT

[(MAIN RECORD FLAGS - "C" AND/OR ("R" OR "N"))##] (1ST SECTION HEADING)##
[(1ST SECTION FLAG - "A","B","R" OR "N")##](1ST SECTION TEXT)##...)
(LAST SECTION HEADING)## [(LAST SECTION FLAG)##](LAST SECTION TEXT)

[ ] = OPTIONAL

ON-LINE DOCUMENTATION FACILITY

This application is a continuation of application Ser. No. 383,578, filed June 1, 1982.

BACKGROUND OF THE INVENTION

Computer systems often include an on-line documentation facility whereby various kinds of system information is made available to users in response to the issuance of documentation, or "help," commands. For example, a user might issue a documentation command such as HELP TERM=BILLING_IDENTIFIER in response to which the system will provide documentation to the user at his or her terminal as to the meaning of the term "billing identifier" as it is used in the system. Or the user might issue a documentation command such as HELP COMMAND=CALL in response to which the system will provide documentation as to how the "call" command is to be used. Another possibility is a documentation command such as HELP ERROR-=E_NOT_FOUND in response to which the system will provide documentation about the error whose mnemonic is E_NOT_FOUND.

SUMMARY OF THE INVENTION

In the past, documentation of this type has been defined wholly from within the system, i.e., by the system designers. In accordance with the invention, however, users of a computer system offering on-line documentation are provided with the capability of defining "user-specific" documentation for a particular documentation command by specifying modifications to be made to the "system documentation" for that command, i.e., the documentation that would otherwise be provided by the system. (The term "user," as employed herein, includes not only a single individual, but also a community of individuals, such as the individuals who access the system under a particular account number.)

It is, of course, necessary that the system documentation remain intact so that it can be made available to other users either in its original form or as modified by such other users. In preferred embodiments, this is achieved by maintaining one or more system documentation files and, in addition, one or more user documentation files for each user who desires to take advantage of the user-specific documentation capability. In particular, the system files contain the system documentation. The user files contain documentation texts provided by the user, accompanied by instructions as to how those texts are to be used to modify the system documentation. Stated another way, the user files contain information indicating how the user-specific documentation and system documentation associated with one or more documentation commands differ. When a particular documentation command is issued by the user, the system accesses the system documentation files and user documentation files, as needed, and provides the appropriate user-specific documentation.

BRIEF DESCRIPTION OF THE DRAWING

In the accompanying drawing.

DETAILED DESCRIPTION

Figure 1:
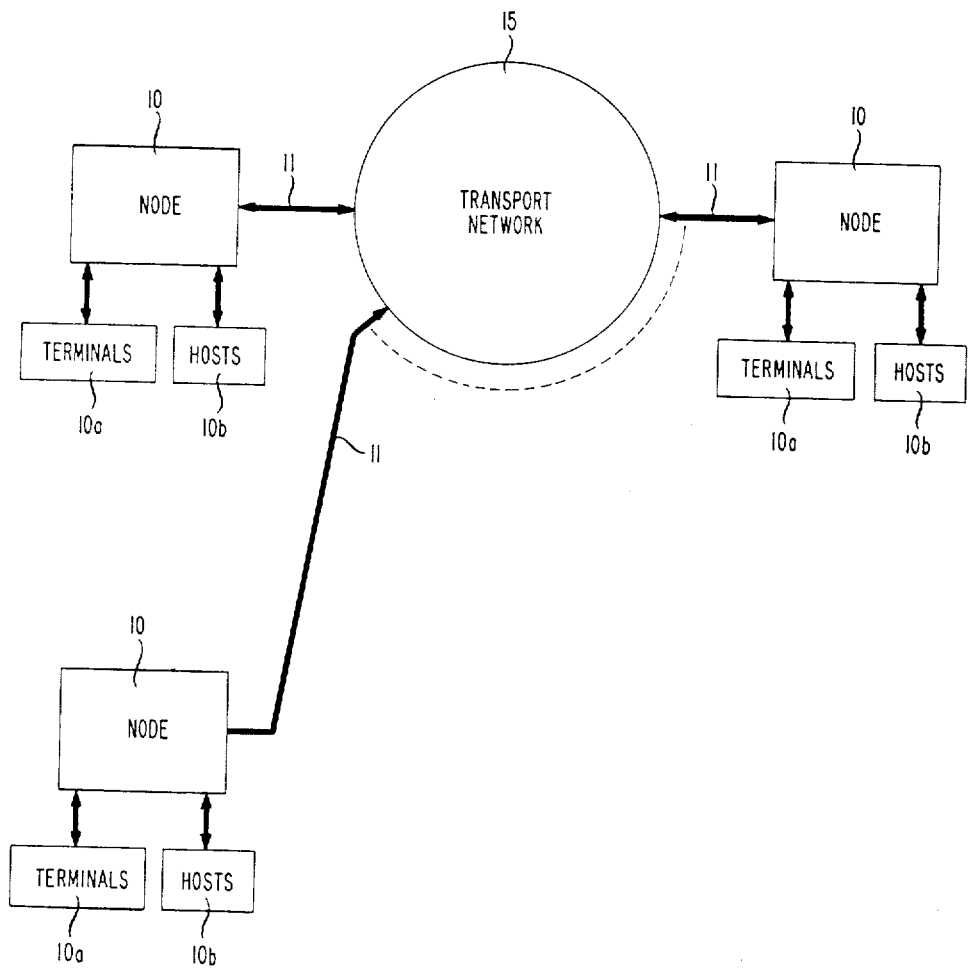
FIG. 1 is a block diagram of a data processing/communications system in which the invention is used.

Table I below shows the system documentation returned to a user of the computer system of FIG. 1 in response to the documentation command HELP COMMAND=CALL.

TABLE I
---
\*\* CALL \*\*
\* USAGE \*
PACKAGE - SPHP
call (nsa =) /nsa/
    (mode = /mode/)
\* EXPLANATION \*
The call command causes the named program to be executed.
\* ARGUMENTS \*
NSA:
The program installed at the given NSA is executed.
MODE:
The terminal mode is changed to the indicated value before the program is run. The mode may be one of common, transparent, or class_specific.

In accordance with the invention, users of the system are provided with the capability of defining user-specific documentation for a documentation command by specifying modifications to be made to the system documentation, i.e., the documentation that would otherwise be provided by the system in response to the documentation command in question. For example, Table II shows a version of the system documentation presented in Table I as modified by a user to provide "user-specific" documentation for the "call" command.

TABLE II
---
\*\* CALL \*\*
\* USAGE \*
call <Network Standard Address> ( mode = <common or class_specific>)
\* EXPLANATION \*
Programs are "named" by a 10 digit Network Standard Address (NSA). The call command causes the named program to be executed.
\* ARGUMENTS \*
NSA:
The program installed at the given NSA is executed.
MODE:
The terminal mode is changed to the indicated value before the program is run. The mode may be one of common, transparent, or class_specific. The mode "transparent" is not currently supported and should not be used.
\* EXAMPLE \*
call 0451271234 mode = class_specific
This command would invoke the Standard Customer Control Program and place your terminal in "class_specific" mode.
Note that the "usage" section has been replaced, a sentence has been added to the beginning of the "explanation" section, a sentence has been added to the end of the "arguments" section and a new, "example," section has been FIG. 1 depicts a system in which the present invention is used. The system provides an integrated data processing/communications service to a plurality of customers, and includes a number of nodes 10 which are located on the premises of the vendor of the service. At the heart of each node are one or more digital computers as described below. A plurality of data terminals 10a and host computers, or hosts, 10b are connected to nodes 10 via suitable data lines. Most of the terminals and hosts belong to the customers and are located on their premises. Some, however, belong to the vendor and are used, for example, for system management. Nodes 10 communicate with each other via a packet switched transport network 15. The nodes are connected to the network via respective links 11 which carry data at 56 kb/s using a protocol which conforms to CCITT standard X.25. Various ones of the nodes may be dedicated to specific functions, such as billing, service provisioning, maintenance, etc.

The communications service provides the customers with a number of capabilities. These include time-shared execution of customer- and vendor-provided application programs stored within the nodes; storage of customer data in databases maintained within the nodes; support of customer-program-callable software "building blocks" that provide such services as editing, command interpreting, forms facilities and the like; a distributed processing capability wherein processes executing at various nodes can communicate on a time-critical basis with processes executing at other nodes; and store-and-forward message service.

Figure 2:
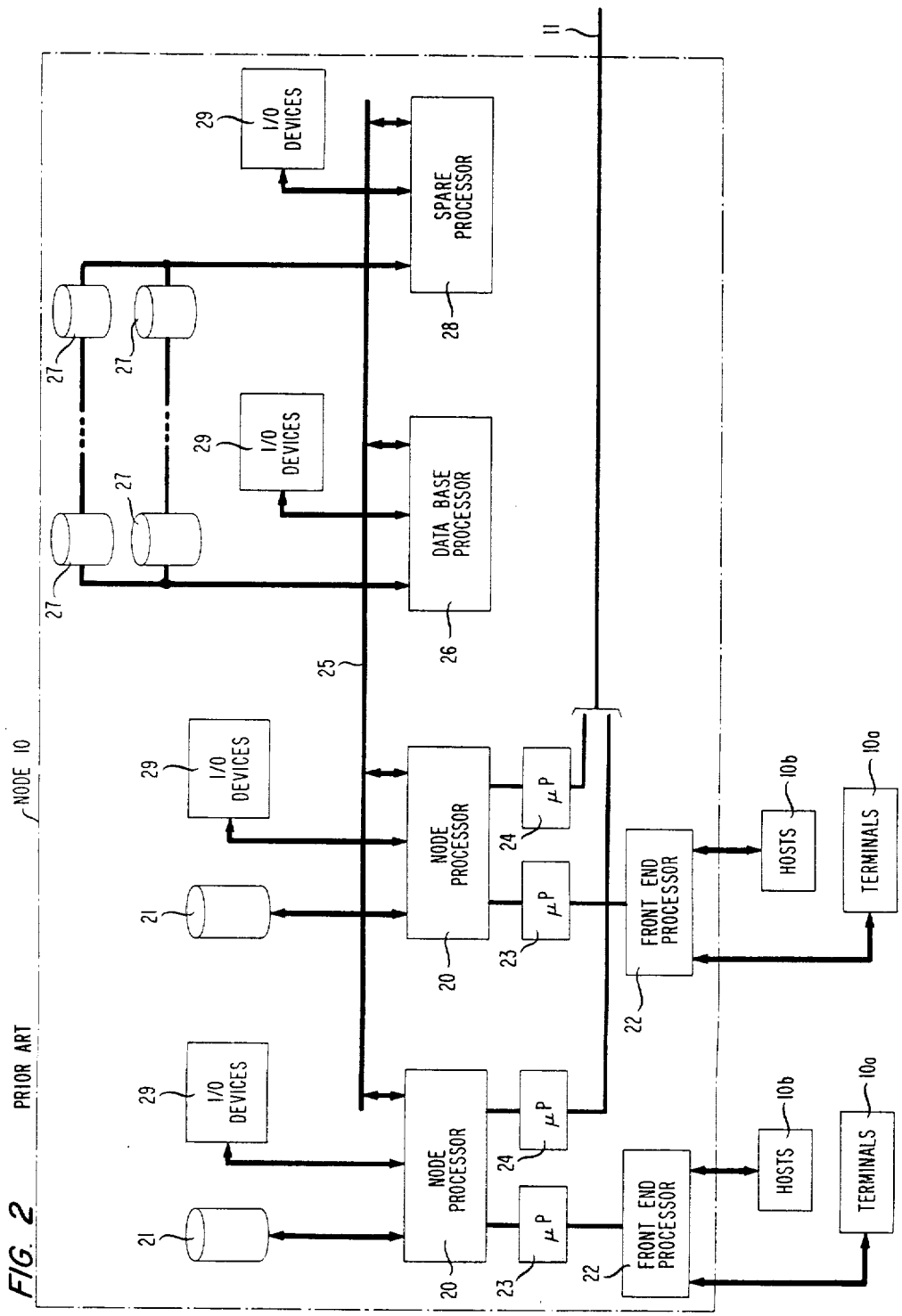
FIG. 2 is a block diagram of a multi-computer node within the system of FIG. 1.

FIG. 2 is a block diagram of an individual one of nodes 10. The node illustratively includes two node processors 20 and a database processor 26. Each of these processors is illustratively a Digital Equipment Corporation (DEC) VAX 11/780 computer running under the DEC-supplied VMS operating system. The node further includes a spare VAX 11/780 processor 28 which can take the place of either the database processor or one of the node processors. Other ones of nodes 10 (FIG. 1) may have fewer or more than two node processors, depending on the anticipated processing demand. Communication among the processors is carried out via bus 25, which illustratively is a DEC-supplied PCL (parallel communication link) bus.

Mass storage, e.g., disk, units 21 are associated with each node processor and mass storage units 27 are associated with database processor 26. Mass storage units 27 are dual ported with, and thus can be accessed by, spare processor 28. Associated with each of the four processors are general purpose input/output (I/O), e.g., CRT, terminal devices 29.

Also associated with each node processor is at least one front-end processor 22 which provides an interface between the node processor, on the one hand, and associated ones of terminals 10a and hosts 10b, on the other hand. Front-end processors 22 are, illustratively, IBM Series/1 computers running under the IBM-supplied RPS operating system. Each front-end processor communicates with its respective node processor using an X.25 protocol. DEC-supplied firmware controlling a DEC-supplied microprocessor 23 performs the DTE role in Level 2 (the "link" level) of the protocol. Another microprocessor 24 associated with each node processor serves a similar function with respect to X.25 communications over link 11.

The function of node processors 20 is to execute programs on behalf of the customers and the vendor. To this end, the mass storage units 21 associated with each processor are used primarily, if not exclusively, to support the processing currently going on in that processor. Virtually all data, programs and other files, both those belonging to the customer and those belonging to the vendor, are stored in a database contained within mass storage devices 27. The function of the latter is to manage the database and to provide the node processors with access to it.

Figures 3, 5, 6:
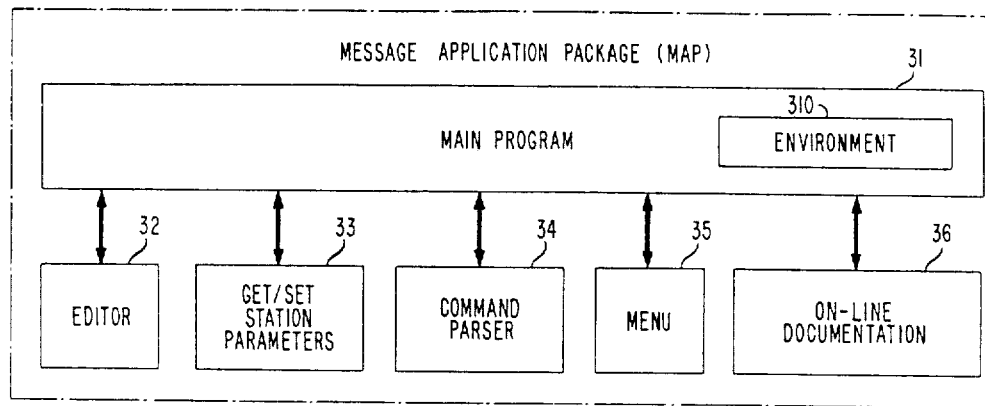
FIG. 3 shows a program package which is executed within the node of FIG. 2 and which includes an on-line documentation facility embodying the principles of the invention.
FIG. 5 shows the format of system documentation records maintained within the system storage area.
FIG. 6 shows the format of user documentation records maintained within the user storage area.

The structure of a typical vendor-supplied application program package, referred to as the Message Application Package (MAP), is shown in FIG. 3. This program package provides the user with such services as text editing, the ability to create and send messages, and various database services.

MAP is comprised of a main program 31 which is linked with a number of utilities, which are called from the main program as subroutines. These utilities include editor 32, which provides the text editing capability; set/get station parameter utility 33, which allows the user to get and set various parameters associated with his or her terminal; command parser 34, which accepts a command line from the user, identifies the command verb (e.g., "call" or "help"), converts it to internal form, and packages the arguments in a form that is appropriate for the utility to which the command is to be passed; menu facility 35, which presents various menus of choices to the user and, depending on the user's selection(s), presents further menus or invokes some action on the user's behalf; and on-line documentation facility 36 which embodies the principles of the invention.

Other vendor-supplied program packages illustratively provided to users (but not shown in the drawing) include a Standard Customer Control Package (SCCP), which provides the user with a mechanism for performing such functions as enabling and disabling programs and stations; and a Standard Parameter Handling Package (SPHP), which provides a function similar to that of get/set station parameter utility 33. Each of these program packages is linked with a respective set of utilities including, in each case, an instance of on-line documentation facility 36.

Figure 4:
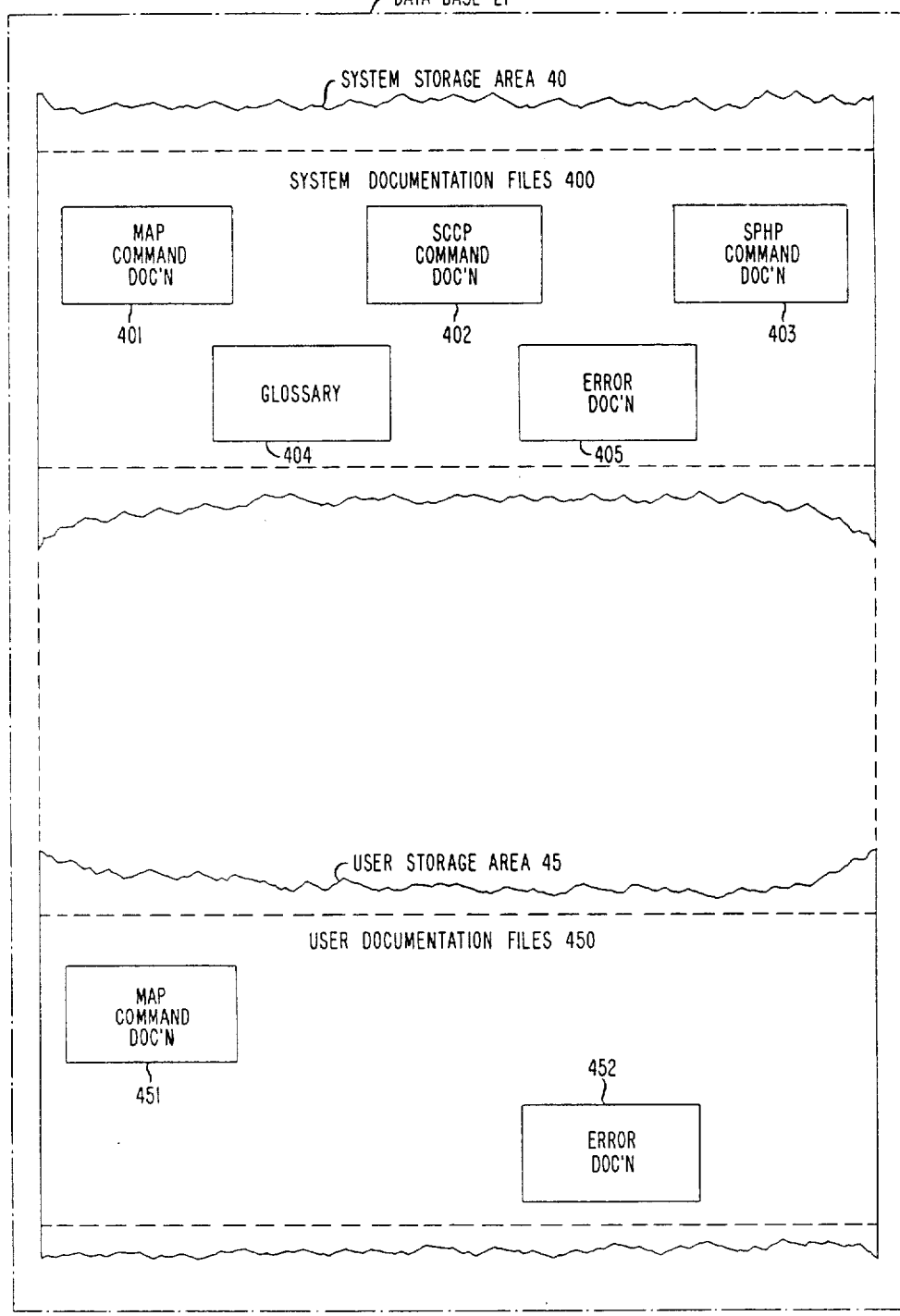
FIG. 4 shows portions of system and user database storage areas maintained within the node of FIG. 2.

Storage area within the database is of two types—system storage area and user storage area. As shown in FIG. 4, system storage area 40 illustratively includes a number of system documentation files 400. Five files are shown explicitly. These are command documentation files 401, 402 and 403, a glossary file 404 and an error documentation file 405. Files 401, 402 and 403 are comprised of records each of which contains system documentation relating to a particular command recognized by MAP, SCCP and SPHP, respectively. Glossary file 404 is comprised of records each of which contains the definition of a particular term used in the system. And error file 405 is comprised of records each of which contains information about a particular error or warning condition detected by the system and reported back to the user during execution of any of the program packages.

A different storage area is established within the database for each user, and FIG. 4 depicts user storage area 45 associated with one particular user. In accordance with the invention, user storage area 45 includes user documentation files 450, whose records contain user-supplied documentation texts accompanied by instructions as to how those texts are to be used to modify the system documentation for one or more documentation commands. Stated another way, the user documentation files contain information indicating how the user-specific documentation and system documentation associated with one or more documentation commands differ. Their files within the user storage area, illustratively, were created using editor 32.

In this example, the user has chosen to supply documentation information for (a) commands used in MAP and (b) errors. To this end, two user files—MAP command documentation file 451 and error documentation file 452—have been established in the user storage area. Illustratively, the names of these files are identical to the corresponding system documentation files, i.e., files 401 and 405. Thus, once documentation facility 36 has obtained the name of the appropriate system documentation file to be opened, as discussed below, it also possesses the name of the appropriate user documentation file to be opened (if one exists).

Each of the program packages includes a respective data structure referred to as an "environment." The environment for each package contains the file names for the system documentation files associated with that particular program package. In particular, environment 310 associated with MAP (shown in FIG. 3) may contain error, glossary and command file names such as Error.doc, Term.doc and MAP.doc, which are the names of files 405, 404 and 401, respectively. When documentation facility 36 needs to retrieve, for example, command documentation associated with MAP, it consults environment 310 to ascertain the name of the system documentation file to be accessed. The environments associated with SCCP and SPHP each contains the same error and glossary file names as the MAP environment inasmuch as uniform sets of error mnemonics and uniform terminology are used throughout the system. Commands used in each program package vary, however. Thus the SCCP and SPHP environments contain respective command documentation files names—illustratively SCCP.doc and SPHP.doc—which are the names of files 402 and 403, respectively.

Each record within the system and user documentation files is indexed by a "key" whose value is the command, term or error mnemonic to which the record pertains. Thus, a record within either a system or user file which contains the documentation for a particular command, for example, is retrieved by specifying that command as the index key in the database read operation.

The format for a system documentation record, i.e., a record in one of system documentation files 400, is depicted in FIG. 5. The record beings with a field delimiter—illustratively the characters ##—followed by an optional main record flag and associated trailing delimiter, at least a first section heading and, for each section heading, a section text, all of which are separated by ## delimiters.

The value of the main record flag may be the character "C," which stands for "continuation" and indicates that the documentation associated with the index key in question is too long to be contained within one record and is therefore continued in one or more additional records. (Any such additional records are indexed under a key which is formed by adding a numeral to the key under which the first record is indexed, e.g., call1, call2, etc.)

Alternatively, the main record flag may be the character "M," which stands for "menu." This flag indicates that the record in question does not contain actual documentation but, rather, the name of a menu and that when such a record is encountered by documentation facility 36, the latter is to call menu facility 35 and is to specify that menu as the one to be displayed to the user. This type of record is used, for example, where the system provides documentation for a family of command verbs such as "list_file", "list_commands", "list_directories", etc., and it is anticipated that users may enter the incomplete documentation command HELP LIST. In this case, the command documentation file will include a record, indexed under the key "list," which contains an "M" as its main record flag and which contains the name of a menu which will query the user as to which type of "list" command he or she wishes documentation about.

The section headings in the system documentation record shown in FIG. 5 are character strings such as the headings USAGE and EXPLANATION in Table I. The section texts are character strings comprising the texts which follow each section heading.

(Another kind of record used in the system documentation files, which does not follow the format of FIG. 5, is simply comprised of an index key with no initial delimiter. Documentation facility 36 responds when it encounters such a record by immediately accessing the record which is indexed under that key. This mechanism allows the system to automatically correct for certain anticipated user errors. For example, a record comprised of the entry "run_program" could be indexed under the key "run", which is not a valid command. Thus if the user, wanting documentation for the "run_program" command, erroneously issues the documentation command HELP COMMAND=RUN, the documentation facility will first retrieve the record indexed under the key "run". Upon finding that that record simply contains the entry "run_program", it will immediately proceed to retrieve the record indexed under "run_program", thereby automatically correcting for the user's error.)

The format for a user documentation record, i.e., a record in one of user documentation files 450, is depicted in FIG. 6. It is comprised of an initial delimiter, an optional one or two main record flags, at least a first section heading and, following each section heading, an optional section flag and a section text, all of which are separated by delimiters.

The main record flag field may include "C" which, as before, indicates "continuation." It may also include either an "R" or an "N." The "R" stands for "replace" and the "N" stands for "new." These flag values can be used interchangeably, each of them being an instruction indicating that the entirety of this user documentation record is to be used in place of the entirety of the corresponding system documentation record.

The section headings and section texts in the user documentation records are analogous to those in the system documentation records and need not be discussed further.

The section flag can have one of four values—"A," "B," "R," or "N". "A" and "B" stand for "after" and "before" and are respective instructions indicating that the section text in the user record is to be added either after or before the section text of the correspondingly headed section of the corresponding system documentation record. "R" and "N" are, again, interchangeable instructions that stand for "replace" and "new." Each of them indicates that the section text in question is to replace the section text of the correspondingly headed section of the corresponding system documentation record. If the section flag is omitted, the section is treated as though the section flag value was "A." And if the section heading of the user documentation record is not the same as the section heading in any system documentation record, the section flag value becomes irrelevant, as will be seen.

Figure 7:
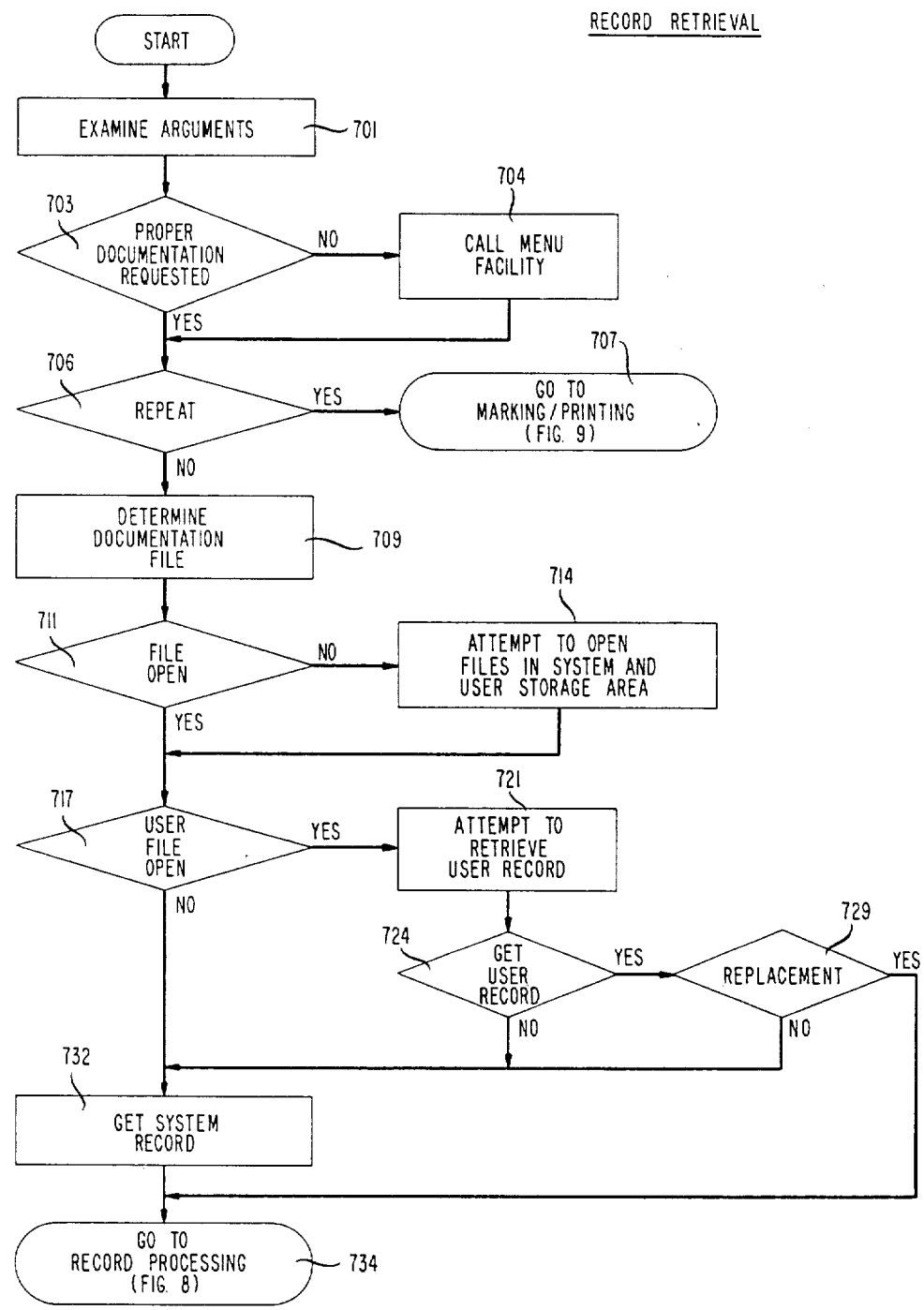
FIGS. 7-9 are flowcharts of the on-line documentation facility.
Figure 8:
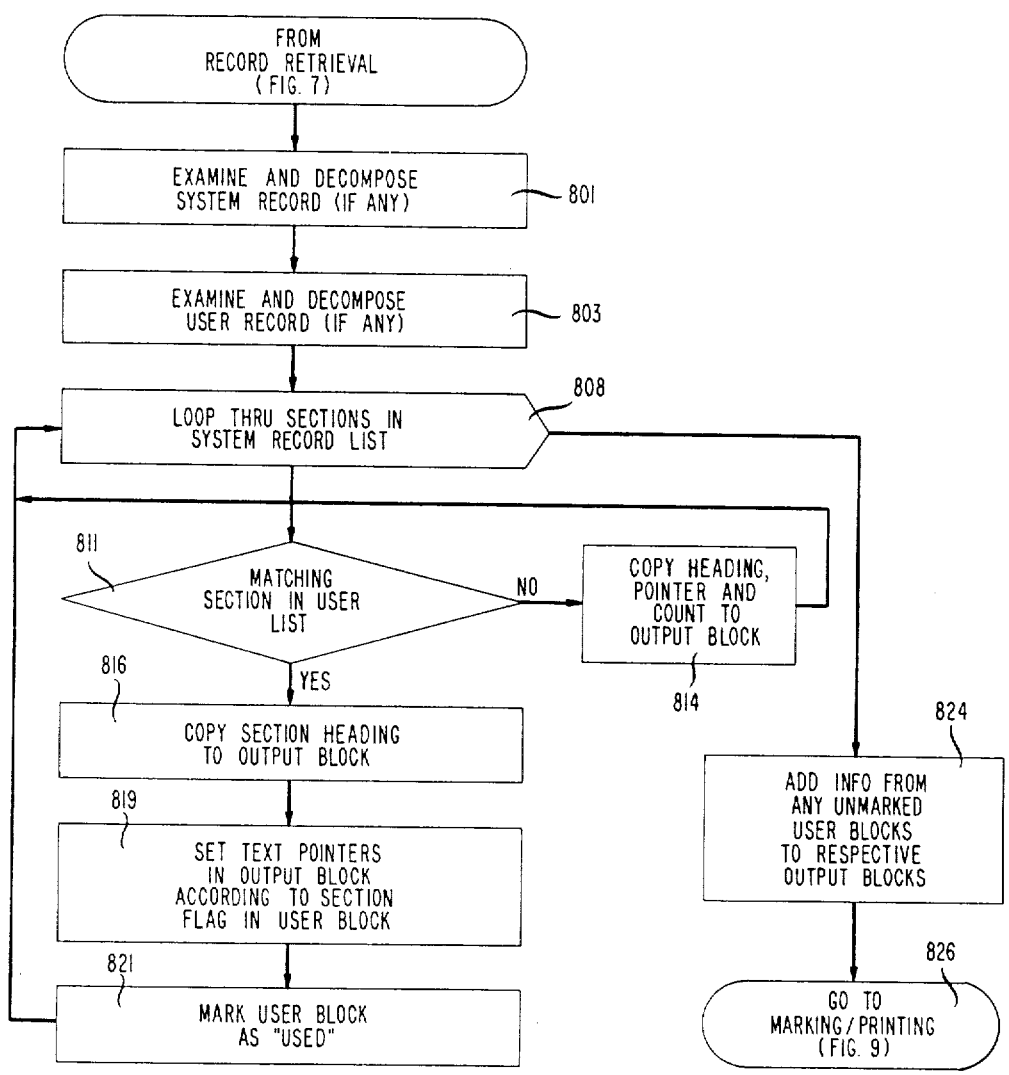
Figure 9:
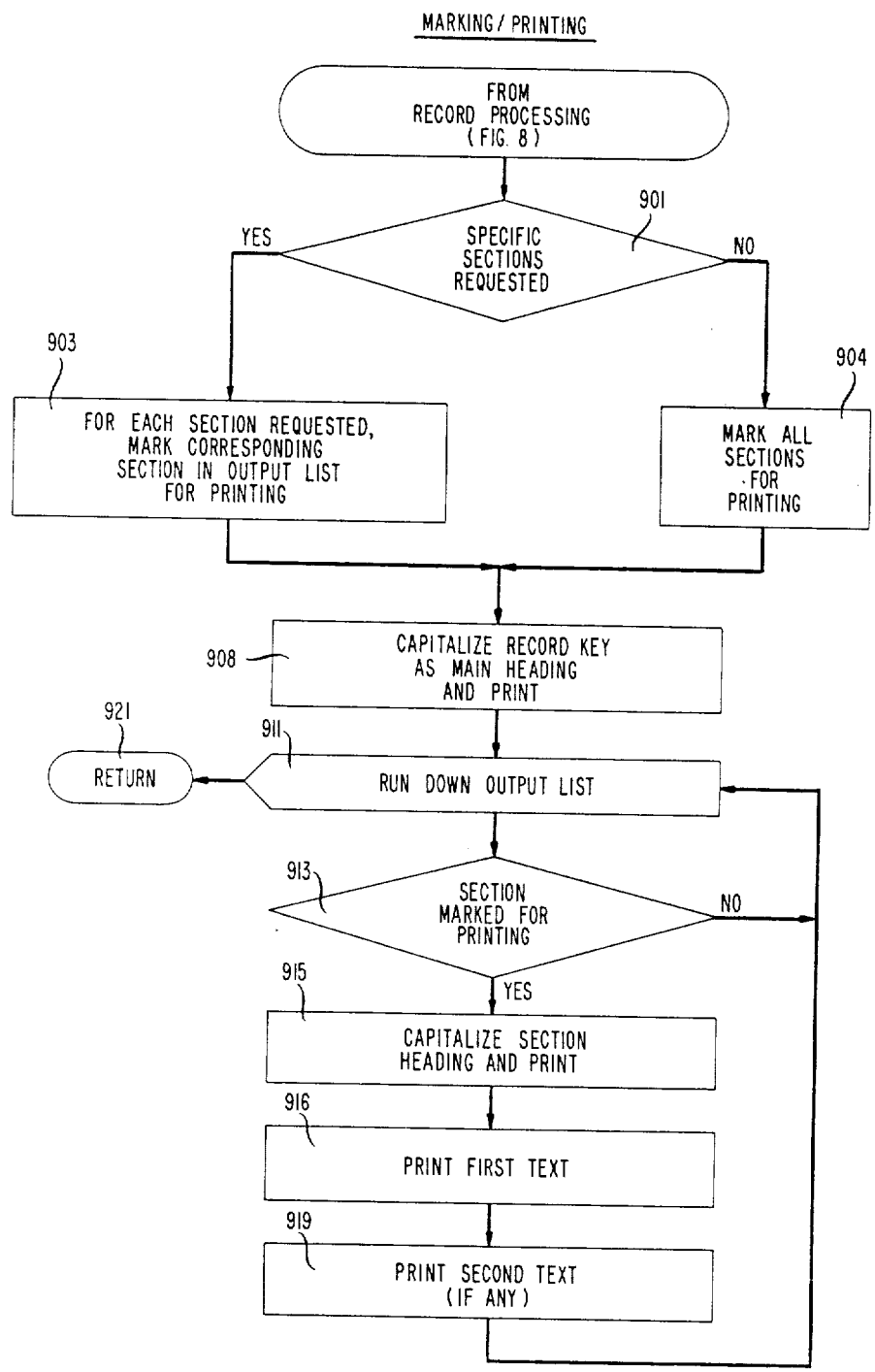

Before proceeding to the flowchart of FIGS. 7-9, it is appropriate at this point to discuss the format of the documentation commands in further detail. As already noted, the user can issue commands such as HELP COMMAND=CALL, HELP TERM=BILLING_IDENTIFIER and HELP ERROR=E_NOT_FOUND, in response to which the system will provide the full documentation available for the command, term or error in question, as modified (if at all) by the user. As an option, the user can eliminate "COMMAND=" in a request for command documentation, e.g., HELP CALL. Another option is that the user can specify that only a certain section or sections of the documentation are to be displayed, e.g., HELP CALL SECTION=USAGE SECTION=EXAMPLE. Yet another option allows the user to get documentation from the command documentation file associated with a program package other than the one he or she is currently using, provided that the user knows the name of that file. For example, a user of MAP could issue the command HELP CALL FILE=SCCP.doc SECTION=ARGUMENTS and thereby get documentation about the arguments for the "call" command as it is used in SCCP.

FIGS. 7-9 comprise a flowchart of on-line documentation facility 36 which, as previously noted, is called as a subroutine, and which is also referred to below as "the routine."

FIG. 7, in particular, depicts the record retrieval portion of the routine. It begins at step 701 by examining the arguments passed to it by command parser 34 to determine just what documentation is being requested. If, as determined at step 703, the user has issued an improper documentation command, e.g., HELP ERROR, the documentation facility calls menu facility 35 at step 704. The menu facility, by eliciting responses from the user will attempt to determine what documentation the user wanted. Once this has been determined, the menu facility formats a documentation request on behalf of the user and passes it back to the documentation facility.

It will be assumed, for purposes of illustration, that the user is executing MAP and has issued a documentation command requesting documentation for the "call" command. As indicated at 706, it is now determined whether the last documentation requested by this user was for the same command that documentation is now being requested, i.e., "call." (That documentation is still available in output record list 1050 (discussed below).) If it is, control passes directly to the marking/printing portion of the routine (FIG. 9).

Otherwise, the documentation facility now determines at step 709 the name of the relevant system, and thus user, command documentation files—in this example, MAP.doc. As indicated at 711, the routine then consults a table that it maintains of the names of open documentation files to determine whether a file or files named MAP.doc is already open. If not, an attempt is made to open a file of that name in both the system and user storage areas, as indicated at 714.

At this point, it can be assumed that a system file under the name in question is open since a system file always exists. A user file for the kind of documentation requested may not exist, however. Thus, it is determined at step 717 whether in fact there is an open user file named MAP.doc. If there is not, the routine proceeds directly to step 732 where the record or (in the case of continuations) records containing the documentation for the command in question is retrieved.

If, on the other hand, a user file named MAP.doc is open, an attempt is made at step 721 to retrieve therefrom user record(s) which document the command "call." If, as determined at step 724, there is no such record, meaning that the user has supplied no documentation for the "call" command, the routine again simply proceeds to step 732. If a user record does exist, however, its main record flag field (FIG. 6) is checked for the presence of an "R" or "N." This would indicate that the user documentation for the "call" command is to replace the system documentation in toto, in which case step 732 is skipped since the system record containing the documentation for the "call" command will not be needed. If, on the other hand, the user record is not such a replacement record, the system record must also be retrieved and, as before, step 732 is executed.

At this point, control passes to the record processing portion of the documentation facility, as indicated at 734. This portion of the routine, shown in FIG. 8, begins with step 801, wherein the previously retrieved system documentation record, if any, is examined and decomposed. This involves the making of entries in a so-called system record list 1010 depicted in FIG. 10. The system record list is a predefined array of data structures—system blocks 1020—each of which includes storage locations for holding the following information from, or about, a respective section of the system record: the section heading, which is stored at location 1021; a pointer to the location of the section text, which is stored at location 1022; and a count of the number of characters in the text, which is stored at location 1023.

Figure 10:
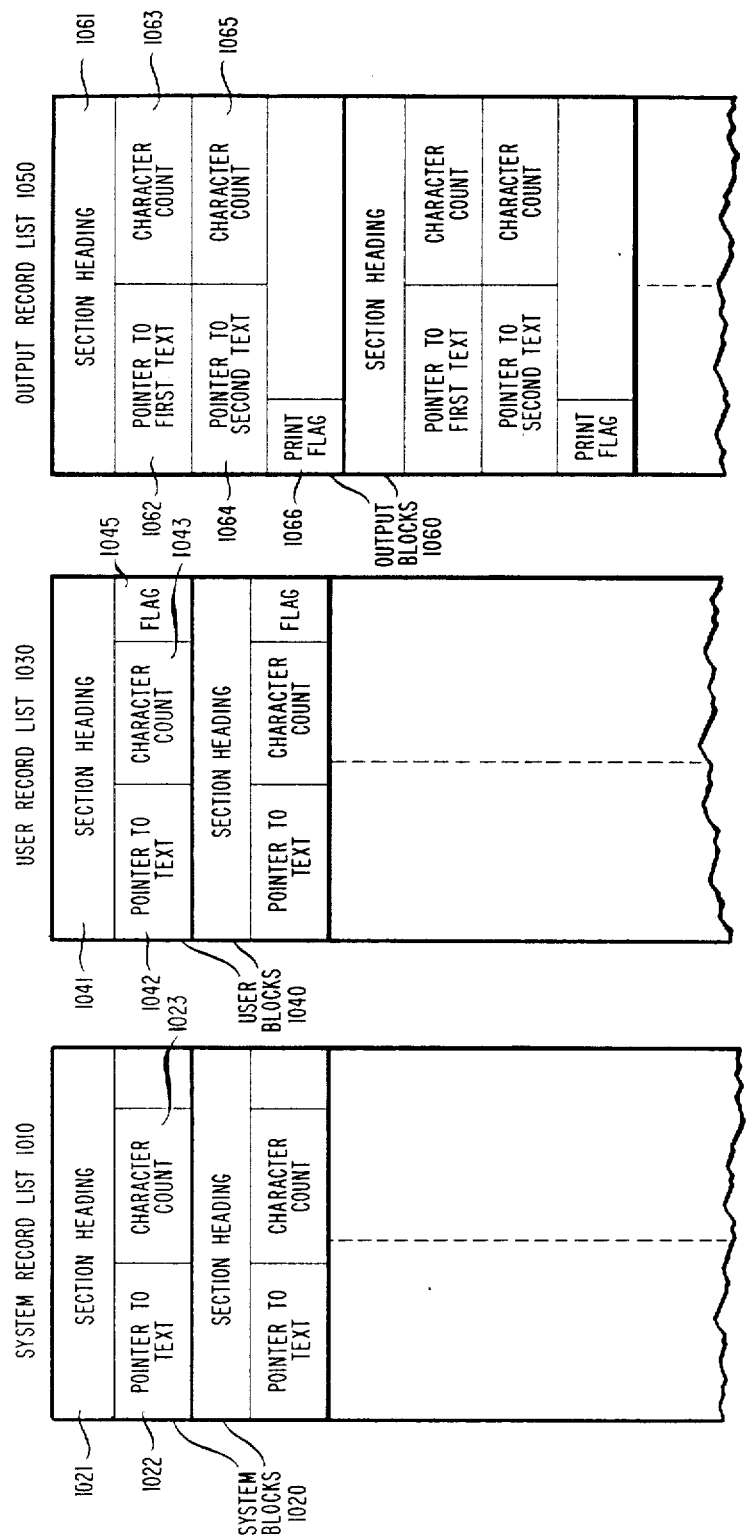
FIG. 10 shows system, user and output record lists created by the on-line documentation facility during its execution.

Referring back to FIG. 8, the routine now proceeds to step 803 at which the previously retrieved user documentation record, if any, is similarly examined and decomposed into a user record list 1030, also shown in FIG. 10. The user record list is comprised of user blocks 1040. Each user block, in addition to having storage locations for a section heading, a text pointer and a character count, which are stored at locations 1041, 1042 and 1043, respectively, has a storage location 1045 for the section flag value (A, B, R or N) described above.

The system and user record lists are used to create a so-called output record list 1050 as will be described shortly. This list is comprised of an array of output blocks 1060, each of which has a storage location for the following information: a section heading, a pointer to a first text, a character count for the first text, a pointer to a second text, a character count for the second text and a print flag, which are indicated at 1061 through 1066, respectively.

In particular, the routine fills in output record list 1050 by executing a loop, as indicated in FIG. 8 at 808. In each pass through the loop, it examines a successive one of system blocks 1020 and determines, at step 811, whether there is a matching section heading in any one of user blocks 1040. If there is not, the routine proceeds to step 814 at which the section heading is copied from location 1021 in the system block into location 1061 in the next available one of output blocks 1060. In addition, the text pointer and character count are copied from locations 1022 and 1023 of the system block into locations 1062 and 1063 of the output block as the first text pointer and first character count, respectively. The second text pointer in the output block, stored at location 1064, is cleared to a null string. The routine then loops around to process the next system block.

If, on the other hand, there is a section heading in one of user blocks 1040 which matches the section heading in the system block currently under consideration, the routine copies that heading into location 1061 of the next available output block at step 816 and then, at step 819, sets the text pointers (and corresponding character counts) in the output block in accordance with the value of the section flag stored in the user block at location 1045. If, in particular, the section flag value is "A" (for "after"), the first and second text pointers stored in the output block at locations 1062 and 1064 are given the values of the text pointers stored at locations 1022 and 1042 of the system and user blocks, respectively, and similarly for the character counts. If the section flag is "B" (for "before"), the output block text pointers and character counts are assigned those same values but in the opposite order. If the section flag is "R" (for "replace") or "N" (for "new"), the system documentation for the particular section is to be wholly replaced by the user documentation. In this case, the first text pointer and character count in the output block are given the values of the user block text pointer and character count and the second output block text pointer is made a null string. As indicated at step 821, the user block in question is now marked as having been "used"—illustratively by making its section heading a null string.

Once all of system blocks 1020 have been processed in this way, the loop is exited and the routine passes to step 824. Here it scans user record list 1030 for any unmarked user blocks, i.e., any blocks whose section headings are not null strings. The information from any such user block is copied into a respective one of the output blocks in the same way that the information in a system block which has no matching user block is copied into an output block, as described above in connection with step 814. It will be appreciated from the foregoing that the section flag value is irrelevant in this case.

As indicated at 826, the routine now proceeds to its section marking/printing portion, which is shown in FIG. 9. If the documentation command specified that only certain sections are to be displayed, as is determined at step 901, the print flag in the appropriate output block is set, as indicated at step 903. Otherwise, the print flags in all the output blocks are set, as indicated at step 904.

The documentation is now ready to be "printed," i.e., displayed to the user. First, the record key that was used for record retrieval is capitalized and printed with double asterisks as the main heading at step 908 (e.g., CALL in Tables I and II). Then each block of output list 1050 is considered in turn via a loop which begins at 911. Within the loop, each output block is first checked at step 913 to see if it has been marked for printing. If not, consideration passes to the next block. If the block has been marked for printing, however, the routine passes through steps 915, 916 and 919, at which, respectively, the section heading is capitalized and printed, the first text specified in the output block is printed and the second text, if any, is printed.

Once all the output blocks have been considered, the routine returns to its caller.

Although a specific embodiment of the invention is shown and described herein, this is merely illustrative of the principles of the invention. Those skilled in the art will be able to devise numerous arrangements which, although not explicitly described herein, nonetheless embody those principles and thus are encompassed by the spirit and scope of the invention.

What is claimed is:

1. A method performed by an on-line documentation program executing in a computer system, said method comprising the steps of
    maintaining in a file within said computer system particular predefined system on-line documentation associated with a particular on-line documentation command,
    receiving from at least one user of said system user-specific on-line documentation associated with said particular on-line documentation command, said at least one user being other than a designer of said computer system,
    retrieving from said file and providing to each other individual user of said system, in response to each issuance by said each other user of said particular on-line documentation command, said particular predefined system on-line documentation associated with said particular on-line documentation command, and
    providing to said at least one user of said system, in response to each issuance by said at least one user of said particular on-line documentation command, said user-specific on-line documentation, said user-specific on-line documentation being different from said system on-line documentation.

2. An on-line documentation method for use in a computer system, said method comprising the steps of
    receiving from at least one user of said system user-specific on-line documentation associated with a particular on-line documentation command,
    providing to other individual users of said system, in response to each issuance by said other users of said particular on-line documentation command, system on-line documentation associated with that particular on-line documentation command, and
    providing to said at least one user of said system, in response to each issuance by said at least one user of said particular on-line documentation command, said user-specific on-line documentation, said user-specific on-line documentation being different from said system on-line documentation,
    wherein said computer system includes means for storing the system on-line documentation associated with said particular on-line documentation command and for storing system on-line documentation associated with other on-line documentation commands that can be issued by the users of said system, and wherein the second of said providing steps includes the steps of
    storing one or more user documentation texts associated with at least said particular on-line documentation command, storing an instruction associated with each user documentation text which indicates how that user documentation text is to be used to modify the stored system on-line documentation associated with said particular on-line documentation command, and creating said user-specific on-line documentation in accordance with each said instruction.

3. The method of claim 2 wherein the system on-line documentation associated with each on-line documentation command includes one or more sections of system documentation text and wherein in said creating step each user documentation text associated with said particular on-line documentation command is either added to a corresponding system documentation text, used to replace a corresponding system documentation text or used as a separate section in said user-specific on-line documentation, as determined by the instruction associated with that user documentation text.

4. A method performed by an on-line documentation program executing in a computer system, said program being adapted to display on-line documentation in response to associated on-line documentation commands, said method comprising the steps of receiving, from each of a plurality of users of said system, user-specific on-line documentation associated with a particular on-line documentation command, each of said users being other than a designer of said computer system, and displaying for each one of said plurality of users of said system, in response to said particular on-line documentation command issued by said one of them, the user-specific on-line documentation previously received from said one of them, said user-specific on-line documentation for at least one of said plurality of users being different from said user-specific on-line documentation for at least one other of said plurality of users.

5. A method performed by an on-line documentation program executing in a computer system, said program being adapted to display on-line documentation in response to associated on-line documentation commands, said method comprising the steps of maintaining in a file within said computer system particular predefined system on-line documentation associated with a particular on-line documentation command, receiving, from each of a plurality of users of said system, user-specific on-line documentation associated with said particular on-line documentation command, each of said users being other than a designer of said computer system, and displaying for each one of said plurality of users of said system, in response to said particular on-line documentation command issued by said one of them, the user-specific on-line documentation previously received from said one of them, said user-specific on-line documentation for at least one of said plurality of users being different from said user-specific on-line documentation for at least one other of said plurality of users, said method comprising the further step of retrieving from said file and displaying for each other user of said system, in response to the issuance of said particular on-line documentation command by said each other user, said particular predefined system on-line documentation associated with said particular on-line documentation command.

6. A method for use in a computer system in which on-line documentation is displayed in response to associated on-line documentation commands, said method comprising the steps of receiving, from each of a plurality of users of said system, user-specific on-line documentation associated with a particular on-line documentation command, and displaying for each one of said plurality of users of said system, in response to said particular on-line documentation command issued by said one of them, the user-specific on-line documentation previously received from said one of them, said user-specific on-line documentation for at least one of said plurality of users being different from said user-specific on-line documentation for at least one other of said plurality of users, said method comprising the further step of displaying for each other user of said system, in response to the issuance of said particular on-line documentation command by said each other user, predefined system on-line documentation associated with said particular on-line documentation command, the first of said displaying steps including the steps of storing for each of said plurality of users information indicating how the user-specific on-line documentation to be displayed for that user differs from said system on-line documentation and creating said user-specific on-line documentation in response to said system on-line documentation and said information.

7. The method of claim 6 wherein said information includes one or more user documentation texts and instructions indicating how each user documentation text is to be combined with said system on-line documentation to create said user-specific on-line documentation.

8. An on-line documentation facility for use in a computer system comprising means for maintaining in a file within said computer system particular predefined system on-line documentation associated with a particular on-line documentation command, means for storing for at least one user of said system user-specific on-line documentation received from said one user, said user-specific on-line documentation being associated with said particular on-line documentation command, said at least one user being other than a designer of said computer system, first means for retrieving from said file and providing to each other individual user of said system, in response to each issuance by said each other user of said particular on-line documentation command, said particular predefined system on-line documentation associated with that particular on-line documentation command, and second means for providing to said at least one user of said system, in response to each issuance by said at least one user of said particular on-line documentation command, said user-specific on-line documentation, said user-specific on-line documentation being different from said system on-line documentation.

9. An on-line documentation facility for use in a computer system comprising means for storing for at least one user of said system user-specific on-line documentation received from said one user, said user-specific on-line documentation being associated with a particular on-line documentation command, first means for providing to each other individual users of said system, in response to each issuance by said other users of said particular on-line documentation command, system on-line documentation associated with that particular on-line documentation command, and second means for providing to said at least one user of said system, in response to each issuance by said at least one user of said particular on-line documentation command, said user-specific on-line documentation, said user-specific on-line documentation being different from said system on-line documentation, wherein said storing means further includes means for storing the system on-line documentation associated with said particular on-line documentation command and for storing system on-line documentation associated with other on-line documentation commands that can be issued by the users of said system, and means for storing one or more user documentation texts associated with at least said particular on-line documentation command and for storing an instruction associated with each user documentation text which indicates how that user documentation text is to be used to modify the stored system on-line documentation associated with said particular on-line documentation command, and wherein said second means further includes means for creating said user-specific on-line documentation in accordance with each said instruction.

* * * * *